No. 806,656. PATENTED DEC. 5, 1905.
G. W. & C. E. GOSS.
HARROW.
APPLICATION FILED FEB. 4, 1905.
2 SHEETS—SHEET 2.
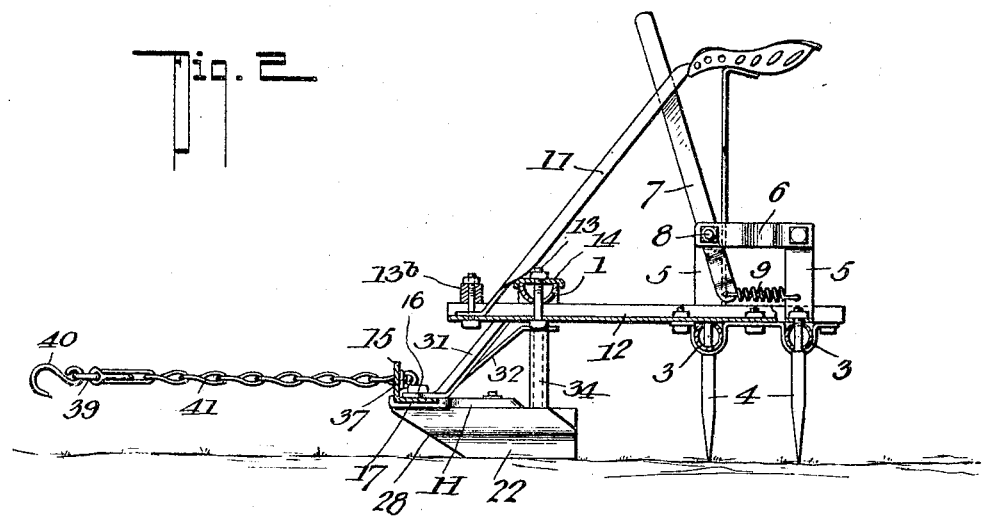
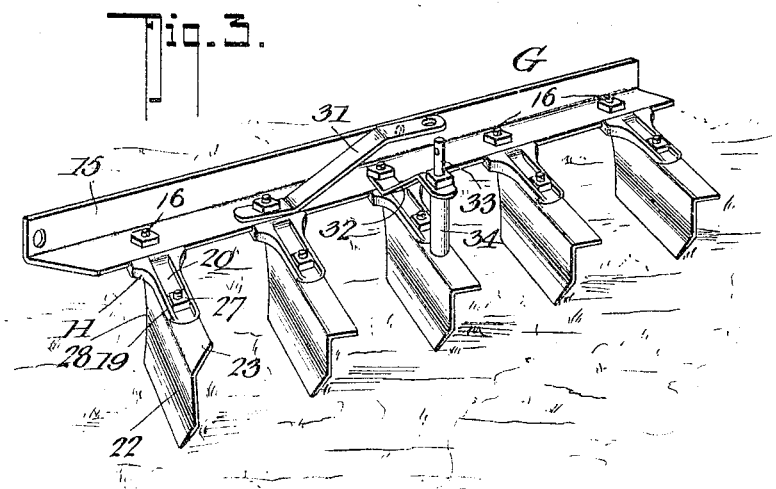
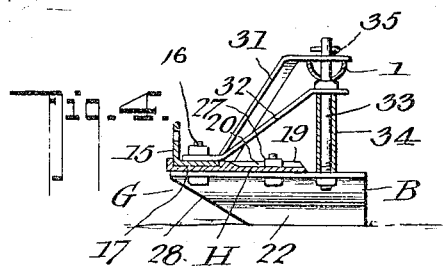
Witnesses
George W. Goss
Charles E. Goss, Inventors.
by C. A. Snow & Co., Attorneys

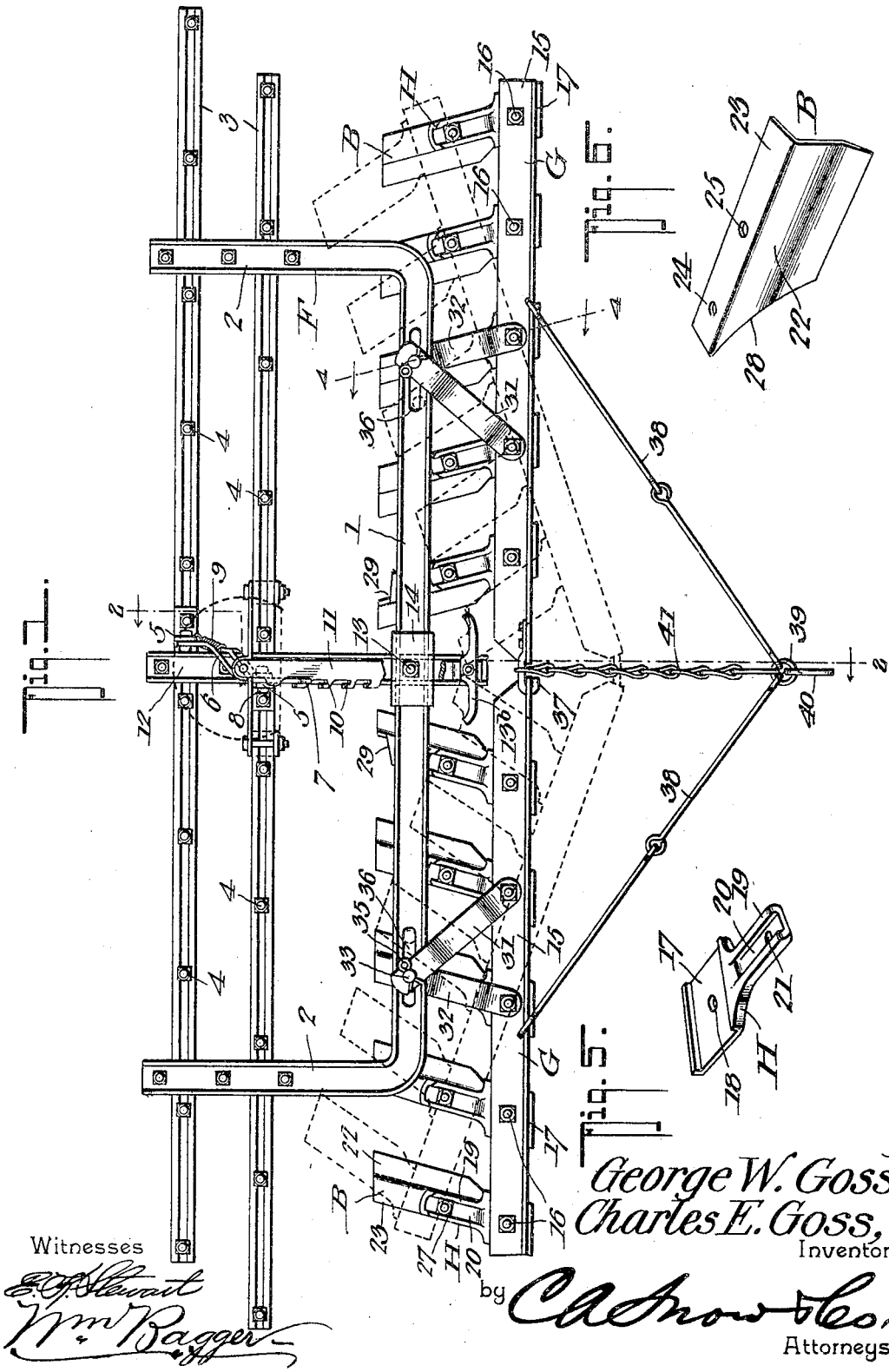

UNITED STATES PATENT OFFICE.

GEORGE W. GOSS AND CHARLES E. GOSS, OF BALTIMORE, OHIO.

HARROW.

No. 806,656.      Specification of Letters Patent.      Patented Dec. 5, 1905.

Application filed February 4, 1905. Serial No. 244,206.

*To all whom it may concern:*

Be it known that we, GEORGE W. GOSS and CHARLES E. GOSS, citizens of the United States, residing at Baltimore, in the county of Fairfield and State of Ohio, have invented a new and useful Harrow, of which the following is a specification.

This invention relates to harrows, and it has for its object to simplify and improve the construction and operation of this class of devices.

The present invention may be described as a compound harrow, as it comprises two sets of earth-engaging implements connected for operation with a single frame. One of these sets of implements consists of ordinary spiked bars connected adjustably with the frame. The other set of implements comprises a pair of gangs connected adjustably and detachably with the draft-frame, but operating in conjunction with the spiked harrow-bars.

The invention consists in the improved construction and novel arrangement and combination of parts, which will be hereinafter fully described, and particularly pointed out in the claims.

In the accompanying drawings has been illustrated a simple and preferred form of embodiment of the invention, it being, however, understood that no limitation is necessarily made to the precise structural details therein exhibited, but that the right is reserved to any changes, alterations, and modifiations to which recourse may be had within the scope of the invention and without departing from the spirit or sacrificing the efficiency of the same.

In said drawings, Figure 1 is a top plan view of a harrow constructed in accordance with the principles of the invention. Fig. 2 is a longitudinal sectional view of the same, taken on the line 2 2 in Fig. 1. Fig. 3 is a perspective view showing one of the gangs detached. Fig. 4 is a detail sectional elevation taken on the line 4 4 in Fig. 1. Fig. 5 is a perspective detail view of one of the holders for the earth-engaging blades. Fig. 6 is a perspective detail view of one of the earth-engaging blades.

Corresponding parts in the several figures are indicated throughout by similar characters of reference.

The main frame F of the improved harrow or implement is composed of channel-iron, preferably U-shaped in cross-section, and it is composed of a front bar 1, having two side bars 2 2, which extend rearwardly from the ends of the front bar at approximately right angles thereto, said front bar and side pieces being preferably bent from a single bar. The under sides of the side pieces are provided with bearings for the rocking bars 3 3, having ordinary teeth or spikes 4 4. The bars 3 3 are provided with uprights 5 5, connected at their upper ends by a link 6. A lever 7 is fulcrumed upon the forward pivotal pin 8 of the link, and the lower end of said lever is connected by a spring 9 with the rear upright 5. The lever 7 is adapted for engagement with any one of a plurality of notches 10 in one side of the seat-supporting bar 11, which is mounted upon the frame F.

When the harrow passes over the ground, the points of the teeth will be pressed in a rearward direction by contact with the soil and the upright bars 5 5 of the toothed bars will be tilted forwardly to a uniform extent, said uprights being connected by the link 6. The tendency will be for the hand-lever 7 to be moved in a forward direction; but the upper end of said hand-lever being firmly supported in one of the notches 11 the only effect will be that of straining the spring 9, which latter is made sufficiently powerful to resist ordinary pressure and at the same time light enough to yield in case obstructions should be encountered by the harrow-teeth. The amount of tilt of the harrow-teeth will be determined by the adjustment of the hand-lever 7.

The frame of the machine includes a central longitudinal channel-bar 12, which is connected with the under side of the front member 1 by a bolt 13 and the under side of which is provided with auxiliary bearings for the tooth-carrying bars 3. A washer 14 is placed upon the upper side of the frame-bar 1 for the passage of the connecting-bolt 13. The seat-bar 11 is preferably secured to the forward end of the bar 12, which latter also supports a foot-rest 13$^b$.

Flexibly connected with the main frame by means which will be presently described are the gangs G G, each of which comprises a frame-bar 15, preferably angular or L-shaped in cross-section, and to the under side of which a plurality of holders H are secured by means of bolts 16. Each of the holders is a casting provided with a transverse groove 17 in the upper side thereof, affording a seat for the frame-bar, an aperture 18 being provided for the passage of the connecting-bolt. Said casting also has an obliquely-extending arm 19, having a groove or channel 20 in the upper side thereof and provided with an aperture 21 for the passage of a bolt. The holders are made right and left, so as to extend obliquely in an inward and rearward direction from each of the frame-bars 15, and to the under side of each of said holders is secured an earth-engaging blade B. Said blades are composed of the shares 22, provided at their upper edges with flanges 23, having apertures 24 and 25 for the passage of bolts, whereby they are connected with the holders. The forward apertures 24 are made to register with the apertures 18 in the holders, through which the bolts 16, whereby the said holders are connected with the frame-bars 15, extend. The apertures 25 are for the passage of connecting-bolts, which also extend through the apertures 21 of the holders and the nuts of which, 27, are seated against rotation in the grooves or channels 20. The forward ends of the shares 22 are cut off obliquely to present earth-engaging edges 28. The rear ends of the flanges 23 of the innermost blades are cut off to form the recesss 29, (plainly seen in Fig. 1 of the drawings,) said recesses having been found advantageous for the purpose of preventing the accumulation of trash.

The gangs G G are connected independently with the frame F by means of straps or links 31 32, which are bolted to or pivotally connected with each of the frame-bars 15. Each of said frame-bars is also provided with a rearward-extending member carrying an upright 33, upon which is mounted a spacing-sleeve 34. In the accompanying drawings the member carrying the upright 33 has been illustrated as being one of the earth-engaging blades B; but it is obvious that special brackets may, within the scope of the invention, be provided for the purpose of supporting said uprights. The spacing-sleeve 34 is interposed between the upright-supporting member B and one of the links or straps 32, which latter is extended beneath the frame-bar 1. The link or strap 31 is extended above the frame-bar 1 and has an aperture engaging the upper extremity of the upright 33, upon which it is secured by readily-detachable means, such as a cotter-pin 35. The frame bar or member 1 is provided with elongated slots 36 for the passage of the uprights 33. The inner ends of the frame-bars 15 are flexibly connected by means of a hook or link 37.

The draft attachment of the device comprises a pair of link-rods 38, the rear ends of which are connected with the upright webs of the angle-bars 15 in any suitable manner which shall admit of the flexible movement of the parts. The front ends of the link-rods 38 are connected with a ring 39, to which is attached a draft-hook 40, and said ring is likewise connected with the member 37, which flexibly connects the inner ends of the frame-bars 15 by means of a draft-chain 41. The link-rods 38 are connected with the frame-bars 15 between the centers and the outer ends of said frame-bars. It follows that when draft is applied to the hook 40 the strain will be equalized upon the frame-bars 15 and also that the angle of said frame-bars may be changed by simply lengthening or shortening the chain 41. When said chain is shortened, the uprights 33 will move in an inward direction in the slots 36 in the frame-bar 1 until a position approximating that shown in dotted lines in Fig. 1 is reached. When the chain 41 is lengthened, the connected ends of the frame-bars 15 will move in a rearward direction and the uprights 33 will move outwardly in the slots 36. At all times, however, the draft will be equalized and no particular part of the machine or its frame will be excessively strained. The object of adjusting the position of the frame-bars 15 is simply to gage the depth of the cut of the blades B, which when the inner ends of the frame-bars are moved forward will cut comparatively deep into the ground.

From the foregoing description, taken in connection with the drawings hereto annexed, the operation and advantages of this invention will be readily understood. The construction is simple and inexpensive, and while it is intended and preferred to use the machine as an entirety, the blades B serving to cut into and partly to turn the soil while the spikes 4 will break up and disintegrate the lumps and clogs, the gangs G may be detached and the parts of the machine may be used independently of each other. To separate the gangs from the frame F, it is only necessary to remove the cotter-pins or fastening members 35, when the links 31 may be slipped off from the uprights and swung to one side, thus enabling the parts to be separated.

Having thus described the invention, what is claimed is—

1. A frame including a front bar having slots, earth-engaging means supporting the rear portion of the frame, blade-carrying gangs having uprights extending through the slots in the front bar of the frame and provided with spacing-sleeves, and links or straps connected with the gangs and engaging the uprights respectively above and below the frame-bar.

2. In a device of the class described, a frame including a front bar having slots formed therein, blade-carrying gangs including bars having rearward-extending members provided with uprights extending through the slots in the frame-bar, links or straps connected with the bars of the gangs and engaging the uprights below and above the frame-bar, and a fastening member such as a cotter-pin extending through said uprights.

3. A frame-bar having slots, blade-carrying gangs having uprights extending through said slots and provided with spacing-sleeves, and links or straps connected with the gangs and engaging the uprights respectively above and below the frame-bar.

4. A frame having a front bar provided with slots, blade-carrying gangs having uprights extending through said slots and movable therein, links or straps connected with the gangs and engaging the uprights respectively above and below the slotted frame-bar, means flexibly connecting the inner ends of the frame-bars of the gangs, draft means connected with said gangs and converging forwardly, and flexible draft means connecting the converging draft means adjustably with the flexibly-connected inner ends of the gangs.

5. In a device of the class described, a frame, flexibly-connected gangs connected slidably with said frame, forwardly-converging draft means connected with said gangs near their outer ends, and adjustable draft means connecting said converging draft means with the flexibly-connected ends of the gangs.

6. In a device of the class described, a frame, flexibly-connected gangs connected slidably with said frame, draft-rods connected with said gangs, a link connecting the front ends of said draft-rods, and a chain connecting said link adjustably with the flexibly-connected ends of the gangs.

In testimony that we claim the foregoing as our own we have hereto affixed our signatures in the presence of two witnesses.

GEORGE W. GOSS.
CHARLES E. GOSS.

Witnesses:
E. C. WILLISON,
S. S. WEIST.